(12) United States Patent
Berkemann et al.

(10) Patent No.: US 10,036,107 B2
(45) Date of Patent: Jul. 31, 2018

(54) NONWOVEN WEB AND FIBERS WITH ELECTRET PROPERTIES, MANUFACTURING PROCESSES THEREOF AND THEIR USE

(75) Inventors: Ralph Berkemann, Riegel (DE); Patrick Lauffenburger, Vogelgrun (FR)

(73) Assignee: Fiberweb Holdings Limited, London (GB)

(*) Notice: Subject to any disclaimer, the term of this patent is extended or adjusted under 35 U.S.C. 154(b) by 362 days.

(21) Appl. No.: 13/818,402

(22) PCT Filed: Aug. 18, 2011

(86) PCT No.: PCT/EP2011/064214
§ 371 (c)(1),
(2), (4) Date: Jul. 8, 2013

(87) PCT Pub. No.: WO2012/025451
PCT Pub. Date: Mar. 1, 2012

(65) Prior Publication Data
US 2013/0288555 A1    Oct. 31, 2013

(30) Foreign Application Priority Data

Aug. 23, 2010 (EP) .................................... 10008742
May 4, 2011 (EP) .................................... 11164767

(51) Int. Cl.
*D06M 11/05* (2006.01)
*D04H 13/00* (2006.01)
(Continued)

(52) U.S. Cl.
CPC .......... *D04H 13/00* (2013.01); *B01D 39/1623* (2013.01); *D04H 1/4291* (2013.01);
(Continued)

(58) Field of Classification Search
CPC ........ D04H 13/00; D04H 1/56; D04H 1/4291; B01D 39/1623; B01D 2239/10;
(Continued)

(56) References Cited

U.S. PATENT DOCUMENTS 3,251,475 A * 5/1966 Till ...................... B01D 25/001
                                                    210/503
3,959,421 A     5/1976 Weber et al.
(Continued)

FOREIGN PATENT DOCUMENTS

EP        0960645       12/1999
EP        1471176       10/2004
(Continued)

OTHER PUBLICATIONS

IUPAC Gold Book, "Fatty Acids", pp. 1-2, dated 1995.*
(Continued)

*Primary Examiner* — Elizabeth M Cole
(74) *Attorney, Agent, or Firm* — McNair Law Firm, P.A.

(57) ABSTRACT

The invention provides a nonwoven electret web comprising fibers made from a thermoplastic polymer material which comprises a polymer, a first additive (a) and a second additive (b), wherein the first additive (a) comprises a hindered amine and the second additive (b) comprises a metal salt of a carboxylic acid and/or an organic amide derived from a carboxylic acid and an amine. The invention further provides a process for making the nonwoven electret web, a fiber, a process for making the fiber, a multi-layer sheet, and the use of the nonwoven electret web, the fiber or the multilayered sheet as a filter material or as a dust-removing fabric for cleaning purposes.

20 Claims, 1 Drawing Sheet

(51) Int. Cl.
*B01D 39/16* (2006.01)
*D04H 1/4291* (2012.01)
*D04H 1/56* (2006.01)

(52) U.S. Cl.
CPC .............. *D04H 1/56* (2013.01); *D06M 11/05* (2013.01); *B01D 2239/025* (2013.01); *B01D 2239/0216* (2013.01); *B01D 2239/0435* (2013.01); *B01D 2239/10* (2013.01); *B01D 2239/1233* (2013.01); *Y10T 442/607* (2015.04); *Y10T 442/626* (2015.04); *Y10T 442/696* (2015.04)

(58) Field of Classification Search
CPC ...... B01D 2239/025; B01D 2239/0216; B01D 2239/1233; B01D 2239/0435; D06M 11/05; Y10T 442/626; Y10T 442/696; Y10T 442/607
See application file for complete search history.

(56) References Cited

U.S. PATENT DOCUMENTS

| | | | |
|---|---|---|---|
| 4,594,202 | A | 6/1986 | Pall et al. |
| 5,496,507 | A | 3/1996 | Angadjivand et al. |
| 5,582,907 | A | 12/1996 | Pall |
| 5,706,804 | A | 1/1998 | Baumann et al. |
| 5,709,735 | A | 1/1998 | Midkiff et al. |
| 5,770,077 | A | 6/1998 | Goldman |
| 5,814,570 | A | 9/1998 | Cohen |
| 5,834,386 | A | 11/1998 | Cohen |
| 5,908,598 | A | 6/1999 | Rousseau et al. |
| 5,968,635 | A | 10/1999 | Rousseau et al. |
| 5,976,208 | A | 11/1999 | Rousseau et al. |
| 6,002,017 | A | 12/1999 | Rousseau et al. |
| 6,034,008 | A | 3/2000 | Lim et al. |
| 6,110,251 | A | 8/2000 | Jackson et al. |
| 6,119,691 | A | 9/2000 | Angadjivand et al. |
| 6,123,752 | A | 9/2000 | Wu et al. |
| 6,214,094 | B1 | 4/2001 | Rousseau et al. |
| 6,237,595 | B1 | 5/2001 | Rousseau et al. |
| 6,238,466 | B1 | 5/2001 | Rousseau et al. |
| 6,261,342 | B1 | 7/2001 | Rousseau et al. |
| 6,268,495 | B1 | 7/2001 | Rousseau et al. |
| 6,375,886 | B1 | 4/2002 | Angadjivand et al. |
| 6,492,183 | B1 | 12/2002 | Perman et al. |
| 6,554,881 | B1 | 4/2003 | Healey |
| 6,627,563 | B1 | 9/2003 | Huberty |
| 6,692,823 | B2 | 2/2004 | Kody et al. |
| 6,759,356 | B1 | 7/2004 | Myers |
| 6,776,951 | B2 | 8/2004 | Rousseau et al. |
| 6,783,574 | B1 | 8/2004 | Angadjivand et al. |
| 6,858,057 | B2 | 2/2005 | Healey |
| 6,858,297 | B1 | 2/2005 | Shah et al. |
| 6,893,711 | B2 | 5/2005 | Williamson et al. |
| 7,179,317 | B2 | 2/2007 | Chung et al. |
| 7,270,693 | B2 | 9/2007 | Chung et al. |
| 7,601,192 | B2 | 10/2009 | Boulay et al. |
| 7,765,698 | B2 | 8/2010 | Sebastian et al. |
| 7,985,060 | B2 | 7/2011 | Leonard |
| 2002/0174869 | A1* | 11/2002 | Gahan et al. ............ 128/206.12 |
| 2005/0077646 | A1 | 4/2005 | Akiba et al. |
| 2008/0249269 | A1 | 10/2008 | Chin et al. |
| 2008/0314010 | A1 | 12/2008 | Smithies et al. |
| 2008/0315465 | A1 | 12/2008 | Smithies et al. |
| 2008/0318024 | A1* | 12/2008 | Angadjivand ..... B01D 39/1623 428/311.51 |
| 2009/0093178 | A1 | 4/2009 | Boye |
| 2009/0142835 | A1 | 6/2009 | Kobayashi et al. |
| 2010/0024370 | A1 | 2/2010 | Jones et al. |
| 2010/0101199 | A1 | 4/2010 | Vesser et al. |
| 2010/0180558 | A1 | 7/2010 | Ito et al. |
| 2010/0219138 | A1 | 9/2010 | Scheerlinck et al. |
| 2010/0282682 | A1 | 11/2010 | Eaton et al. |
| 2011/0041471 | A1 | 2/2011 | Sebastian et al. |
| 2011/0154987 | A1 | 6/2011 | Li et al. |
| 2011/0209619 | A1 | 9/2011 | Lazarevic et al. |
| 2011/0226697 | A1 | 9/2011 | McLellan et al. |
| 2012/0003894 | A1 | 1/2012 | Sumiya et al. |
| 2012/0116338 | A1 | 5/2012 | Ferry et al. |

FOREIGN PATENT DOCUMENTS

| | | | |
|---|---|---|---|
| EP | 1471176 A1 * | 10/2004 | ............. D04H 3/16 |
| JP | 2005131484 | 5/2005 | |
| JP | 2005131485 | 5/2005 | |
| JP | 2006037295 | 2/2006 | |
| JP | 2006037295 A | 2/2006 | |
| JP | 2008214789 | 9/2008 | |
| JP | 2009221618 | 10/2009 | |
| JP | 2009249764 | 10/2009 | |
| JP | 2010082596 | 4/2010 | |
| JP | 2010149037 | 7/2010 | |
| JP | 2010149037 A | 7/2010 | |
| TW | 200906938 A | 2/2009 | |
| WO | 1996/026783 | 9/1996 | |
| WO | 2001/027371 | 4/2001 | |

OTHER PUBLICATIONS

International Search Report issued in corresponding application No. PCT/EP2011/064214, dated Oct. 24, 2011, 3pgs.
Written Opinion of the International Preliminary Examining Authority issued in corresponding application No. PCT/EP2011/064214, dated Dec. 13, 2012, 8pgs.
Laakso, L. et al., "Waterfalls as Sources of Small Charged Aerosol Particles," Atmos. Chem. Phys., 7, pp. 2271-2275 (2007).
Japanese Office Action dated Jul. 14, 2015 in related Japanese Application No. 2013525256.
Chinese Office Action dated Oct. 14, 2015 in related Chinese Application No. 201180041018.0.
Taiwanese Office Action dated Nov. 17, 2015 in related Taiwanese Application No. 100130011.
Office Action No. 17284 of corresponding Mexican application No. MX/A/2013/002223, dated Mar. 7, 2016, all enclosed pages cited.
Decision of Rejection of corresponding Japanese application No. 2013-525256, dated May 10, 2016, all enclosed pages cited.
Third Office Action of corresponding Chinese application No. 201180041018.0, dated Jun. 28, 2016, all enclosed pages cited.
Office Action and Search Report of corresponding Tawianese Application No. 100130011, dated Aug. 10, 2016, all enclosed pages cited.
"Fundamentals and Applications of Non-woven Fabric," The Textile Machinery Society of Japan, Aug. 25, 1993, p. 121, all enclosed pages cited.
Fourth Office Action of corresponding Taiwan (R.O.C.) Application No. 100130011 dated Mar. 27, 2017, all enclosed pages cited.
Allowance Decision of corresponding Taiwan (R.O.C.) Application No. 100130011 dated Jul. 3, 2017, all enclosed pages cited.
Office Action of corresponding Japanese Application No. 2016-177699 dated Aug. 1, 2017, all enclosed pages cited.
Office Action No. 83097 issued in corresponding Mexican Application No. MX/a/2013/002223 dated Nov. 1, 2016, all enclosed pages cited.
Fourth Office Action issued in corresponding Chinese Application No. 201180041018.0 dated Jan. 9, 2017, all enclosed pages cited.
Office Action of corresponding Canadian Application No. 2809200, dated Oct. 13, 2017, all enclosed pages cited.

* cited by examiner

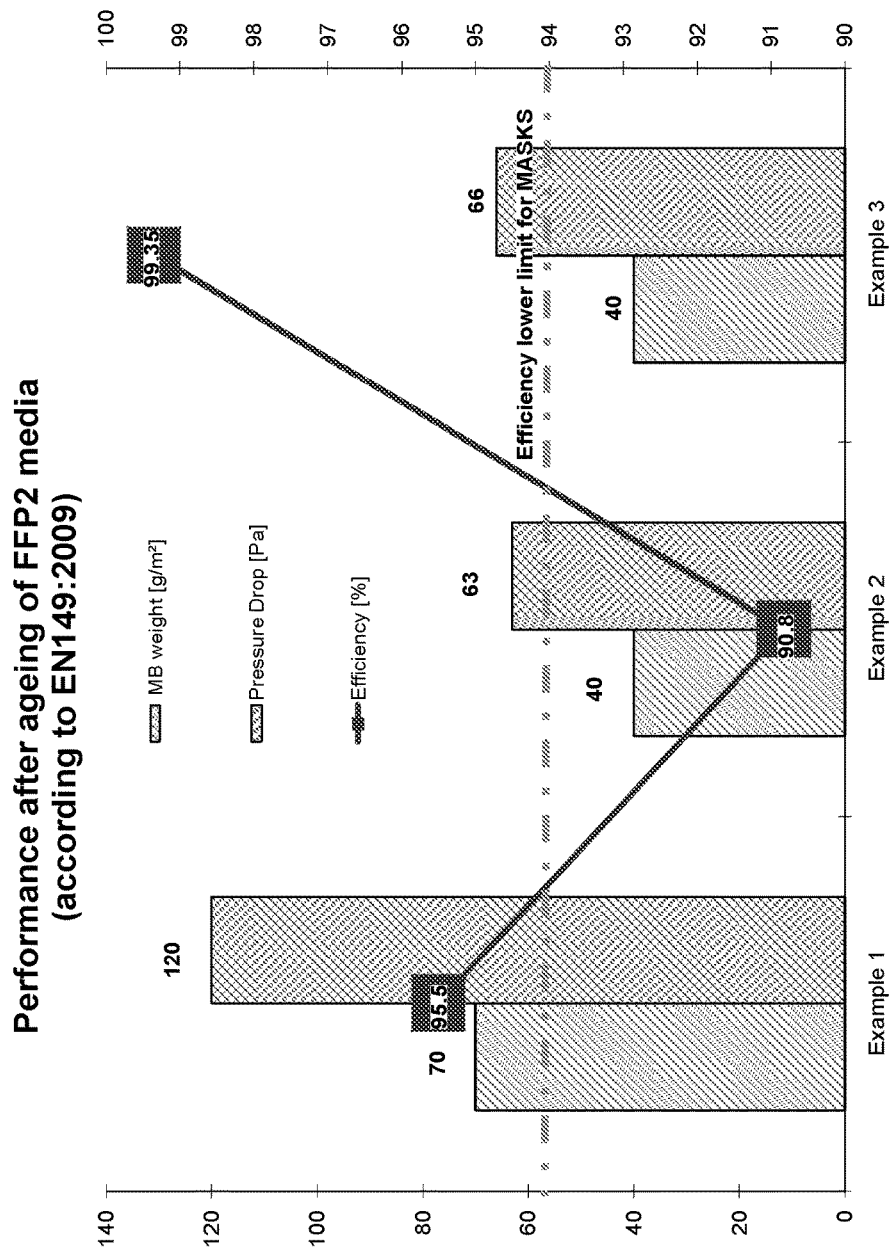

NONWOVEN WEB AND FIBERS WITH ELECTRET PROPERTIES, MANUFACTURING PROCESSES THEREOF AND THEIR USE

This application is a 371 of PCT/EP11/64214 filed Aug. 18, 2011.

FIELD OF THE INVENTION

This application relates to a nonwoven web with electret properties, a process of manufacturing said nonwoven web, a multilayered sheet comprising at least one sheet of the nonwoven electrets web, an article comprising the nonwoven web or the multilayered sheet, a fiber with electrets properties, a process for making the fiber, and the use of the nonwoven web or the multilayered sheet as a filter material or as a dust-removing fabric for cleaning purposes.

BACKGROUND OF THE INVENTION

Nonwoven webs with electret properties are known in the art.

A typical method and apparatus for making a nonwoven fibrous electret web is disclosed in WO 1996/026,783 A1. In this method, one or more free-fibers are formed from a nonconductive polymeric fiber-forming material and exposed to an AC and/or DC corona-discharging device. Charges are placed on the fibers and additives, such as organic amide compounds, to slow down the process of decaying over time or in high ambient temperatures.

Further, a method to create an electret is described in WO-A-01/27,371. In this method one or more free-fibers are formed from a nonconductive polymeric fiber-forming material. An effective amount of water is sprayed onto said free-fibers, and the fibers are collected to form a nonwoven fibrous web. The nonwoven web so obtained is dried to form a nonwoven fibrous electret web.

It is observed, however, that it has been known for a long time that electrical charges can be created by means of a waterfall. In 1892, Philipp Lenard already published the first comprehensive paper about the electricity of waterfalls (see for instance Atmos. Chem. Phys., 7, 2271-2275, 2007). Lenard already taught that electric charges can be created by spraying deionized water thereby forming large and small electrically charged droplets. Hence, the skilled person already understood at an early stage that water quenching steps applied to free fibers or a formed nonwoven web would form electric charges on the surface of the water quenched free fibers or nonwoven webs.

SUMMARY OF THE INVENTION

It is an object of this invention to provide nonwoven electret webs with excellent filtration performance which are easy to manufacture and which carry a high amount of charges combined with slow decay characteristics.

Further objects of this invention will become apparent from the following description.

Definitions

In this description the following terms are understood to have the definition as hereinafter defined. Textile and fabric shall be used a synonyms.

A fiber is a single, slender strand of material. For melt spun fibers the material for instance comprises thermoplastic polymers. Another material used for producing fibers is regenerated cellulose. Additionally, various other solvable polymers can be spun in a solvent spin process.

A micro fiber is a fiber with a fiber diameter typically within the range of 0.1-20 µm; a nano fiber is a fiber with a fiber diameter in the submicron range of 50 nm to 1 µm. Micro fibers and nano fibers can, for example, prepared using a melt-blown process. The fibers obtained from a melt-blown process are called melt-blown fibers.

A precursor web is a web of fibers which have not been bonded yet, i.e. it is an unbounded web.

A nonwoven is a sheet of fibers or chopped yarns of any nature or origin that have been formed into a web by any means, and bonded together by any means, with the exception of weaving or knitting. Felts obtained by wet milling are not nonwovens.

Wetlaid webs are nonwoven webs provided they contain a minimum of 50% of man-made fibers or other fibers of non vegetable origin with a length to diameter ratio of at least 300, or a minimum of 30% of man-made fibers with a length to diameter ratio of at least 600, and have a maximum apparent density of 0.40 g/cm$^3$.

Composite structures are considered nonwovens provided their mass is constituted of at least 50% of a nonwoven as defined hereinabove, or if the nonwoven component plays a prevalent role.

A spunbond web shall generally refer to a web comprising fibers which are formed by extruding a molten thermoplastic material from a plurality of fine capillaries of a spinnerette. After extruding the diameter of the extruded fibers is rapidly reduced by, for example, drawing them by a gas stream or by other mechanisms. After web formation a plurality of the fibers are bonded.

The term polymer generally includes, but is not limited to, homopolymers, copolymers, such as, for example, block, graft, random and alternating copolymers, and blends and modifications thereof. Furthermore the term polymer shall include all possible molecular arrangements of the material. These arrangements include, but are not limited to isotactic, syndiotactic and random arrangements of the recurring units forming the polymer.

The term multilayered sheet shall mean a multilayered composite or laminate of at least two layers of the same or different kind of sheet material. This can be, for example, a combination of a nonwoven of any kind with a polymeric film, polymeric fibers, thermal calendar bonded sheets or ultrasonically bonded sheets.

DETAILED DESCRIPTION OF THE INVENTION

Unexpectedly, it has been found that highly attractive nonwoven electret webs can be prepared by treating fibers that comprise a particular combination of selected additives before or during a web-formation process with a polar liquid. The electret webs so obtained have high amounts of electrical charges which are even stable in post processing steps of the web, such a heat-treatment step or an oil mist treatment step.

The present invention therefore relates to a nonwoven electret web comprising fibers made from a thermoplastic polymer material which comprises a first additive (a) and a second additive (b), wherein the first additive (a) comprises a hindered amine and the second additive (b) comprises a metal salt of a carboxylic acid and/or an organic amide derived from a carboxylic acid and an amine.

The nonwoven electret web of the present invention is characterized by the presence of at least the first and second additives.

In a first embodiment of the present invention, the first additive (a) comprises a hindered amine and the second additive (b) comprises an organic amide derived from a carboxylic acid and an amine. In a second embodiment of the present invention, the first additive (a) comprises a hindered amine and the second additive (b) comprises a metal salt of a carboxylic acid. In a third embodiment of the present invention, the first additive (a) comprises a hindered amine and the second additive (b) comprises a metal salt of a carboxylic acid and an organic amide derived from a carboxylic acid and an amine.

Suitably, the first additive (a) comprises a hindered amine and the second additive (b) comprises a metal salt of a carboxylic acid. Preferably, the first additive (a) comprises a hindered amine and the second additive (b) comprises an organic amide derived from a carboxylic acid and an amine.

It will be understood by the skilled person that the first and second additives to be used in the present invention will be melt processable additives, i.e. additives that are processable under conditions when from a thermoplastic polymer material fibers are formed.

The first additive (a) comprises a hindered amine. Hindered amines are chemical compounds containing an amine functional group surrounded by a crowded steric environment. They have uses such as gas scrubbing, as stabilizers against light-induced polymer degradation, and as reagents for organic synthesis.

When used as light stabilizers for plastics these compounds are also known as hindered amine light stabilizers (HALS).

Typically hindered amines are characterized by the presence of one or more 2,2,6,6-tetraalkylpiperidyl groups, preferably one or more 2,2,6,6-tetraalkylpiperidyl-4-amino groups. The 2,2,6,6-tetraalkylgroups are preferably alphatic groups with 1 to 6 carbon atoms, for example hexyl-, pentyl-, butyl-, propyl-, ethyl- and methyl-groups. Preferably all four alkyl groups are methyl groups. The piperidyl group is preferably covalently bound at the 4-position or via the 4-amino group to another organic group, preferably to a polymer.

In the present invention the hindered amine, however, serves as a trap for the charges generated in the fiber by the treatment with the polar liquid.

There are numerous hindered amines commercially available. All types of hindered amines can be used in accordance with the present invention. Preferably, the hindered amine is a polymeric hindered amine. Polymeric hindered amines are preferred because their migration within the fiber-forming polymer is limited. The polymeric hindered amines to be used in accordance with the present invention also include oligomeric hindered amines.

In the present invention the first additive (a) and second additive (b) are suitably present in an amount between 0.1-20% by weight, preferably in an amount between 0.5-10% by weight, and more preferably in an amount between 0.5 and 3% by weight, based on total fiber weight.

Preferably, the first additive (a) comprises a polymeric hindered amine which is present in the fiber in an amount between 0.5-3% by weight, based on total fiber weight, wherein the polymeric hindered amine contains a plurality of 2,2,6,6-tetraalkyl-4-piperidyl-4-amino groups which are covalently bound via the 4-amino group to a polymer backbone. More preferably, the hindered amine comprises a poly-[[6-[(1,1,3,3-tetramethyl-butyl)amino]-s-triazine-2,4-diyl]-[2,2,6,6-tetramethyl-4-piperidyl)-imino]-hexamethylene-[(2,2,6,6-tetramethyl-4-piperidyl)-imino]]. This latter compound is also known under the trade name Chimassorb® 944 (available from BASF).

As the second additive (b) a metal salt of a carboxylic acid and/or an organic amide derived from a carboxylic acid and an amine can be used. These compounds are usually known in the art as antiblock agents allowing reduction of surface friction of polymer films. In the present invention these additives can suitably be present in an amount between 0.1-20% by weight, preferably in an amount between 0.5-10% by weight, and more preferably in an amount between 0.5-3% by weight, based on total fiber weight.

In the present invention the second additive (b) serves as an anti-discharge agent for the electric charges when the fibers are aged or heat treated.

The second additive (b) can be an organic amide derived from a carboxylic acid and an amine. There are numerous organic amide types commercially available. A wide variety of organic amides can be used in accordance with the invention. Suitably, the organic amide compound is derived from a carboxylic acid having 6-50, preferably 14-22, more preferably 16-29 carbon atoms, and an amine. Preferably, organic bis-amides are used which are derived from organic diamines which are reacted with two carboxylic acids. More preferably, organic amides are used which are derived from aliphatic amines. Most preferably, organic amides are used which are derived from aliphatic diamines and an aliphatic mono- or dicarboxylic acid. The aliphatic groups in the carboxylic acid group can be saturated or ethylenically unsaturated with one or more double bonds per molecule. Preferably, saturated aliphatic carboxylic acids are used.

Examples for saturated aliphatic carboxylic acids which can be used as components for the organic amides to be used in accordance with the present invention are hexanoic acid, heptanoic acid, caprylic acid, pelargonic acid, capric acid, lauric acid, myristic acid, palmitic acid, stearic acid, arachidic acid, docosahexaenoic acid, eicosahexanenoic acid and dimer acids.

An example for an ethylenically unsaturated aliphatic carboxylic acid which can suitably be used as a component for the organic amides is oleic acid Examples for aliphatic amines which can suitably be used as components for the organic amides to be used in accordance with the present invention are aliphatic amines with one or two primary and/or secondary amino groups and with 1-6 carbon atoms in the aliphatic group. Preferably, the aliphatic amines comprise two primary and/or secondary amino groups and with 1-6 carbon atoms in the aliphatic group. Specific examples of suitable aliphatic amines include methylamine, ethylamine, propylamine, butylamine, pentylamine, hexylamine, 1,2-diaminoethane, 1,3-diaminopropane, 1,4-diaminobutane, 1,5-diaminopentane and 1,6-diaminohexane.

Preferred organic amide additives to be used in accordance with the present invention are known under the tradename Crodamide® (available from Croda Polymer Additives). Most preferably, the organic amide additive is ethylene-bis-stearamide which is available as Crodamide® EBS.

Preferably, the second additive (b) comprises an organic amide which is present in the fiber in an amount between 0.5-3% by weight, based on total fiber weight, wherein the organic amide is derived from a carboxylic acid having 14-22 carbon atoms and an aliphatic amine with one or two primary and/or secondary amino groups. More preferably, the second additive (b) comprises a bis-amide derived from a saturated or ethylenically unsaturated aliphatic monocarboxylic acid having between 16-20 carbon atoms and a saturated aliphatic amine having two primary amino groups.

In another embodiment of the present invention, the second additive (b) comprises a metal salt of a carboxylic acid suitably having 6-50 carbon atoms. These compounds are usually known in the art as lubricants for polymer films. In the present invention these additives are suitably present in an amount between 0.1-20% by weight, preferably in an amount between 0.5-10% by weight, and more preferably in an amount between 0.5-3% by weight, based on total fiber weight.

In the present invention the metal salt of the carboxylic acid as used as the second additive (b) serves as an antidischarge agent for the electric charges when the fibers are aged or heat treated.

A wide variety of metal salts of carboxylic acids can be used in accordance with the invention. Suitably, the carboxylic acid has 6-50, preferably 10-30, more preferably 14-22, and most preferably 16-20 carbon atoms. Preferably, metal salts of aliphatic mono- or dicarboxylic acids are used. The aliphatic groups in the carboxylic acid group can be saturated or ethylenically unsaturated with one or more double bonds per molecule. Preferably, metal salts of saturated aliphatic carboxylic acids are used.

Examples for saturated aliphatic carboxylic acids which can suitably be used in the form of metal salts as the second additive (b) are hexanoic acid, heptanoic acid, caprylic acid, pelargonic acid, capric acid, lauric acid, myristic acid, palmitic acid, stearic acid, arachidic acid, docosahexaenoic acid, eicosahexanenoic acid and dimer acids.

An example of an ethylenically unsaturated aliphatic carboxylic acid which can suitably be used is oleic acid.

Metal ions that are present in the metal salt can suitably be monovalent or polyvalent. Preferably, the metal salt is bivalent. Preferred metal cations present in the metal salt to be used are cations of earth alkaline metals. Especially preferred are calcium cations or magnesium cations.

Preferred metal salts of carboxylic acids to be used in accordance with the present invention are calcium stearate or most preferred magnesium stearate.

Preferably, the second additive (b) comprises a metal salt of a carboxylic acid which is present in the fiber in an amount between 0.5-3% by weight, based on total fiber weight, wherein said metal salt of said carboxylic acid is preferably an earth alkaline metal salt of a carboxylic acid of 14-22 carbon atoms, more preferably 16-20 carbon atoms. Most preferably, a calcium salt or a magnesium salt of a saturated or ethylenically unsaturated aliphatic monocarboxylic acid having between 16-20 carbon atoms is used.

In addition to an organic amide derived from a carboxylic acid and an amine, a metal salt of an carboxylic acid can be used. The organic amides and these metal salts can be used in any ratio as the second additive (b). If a combination of an organic amide and a metal salt is used, the total amount of these additives is suitably between 0.1-20% by weight, preferably between 0.5-10% by weight, and more preferably between 0.5-3% by weight, based on total fiber weight.

The nonwoven electret web of the present invention can be formed with every web-forming process known in the art. Examples thereof are wet-laid or dry-laid processes.

Preferably, the nonwoven web of the present invention is a spunbond web. More preferably, the nonwoven web of the present invention is a web comprising micro fibers and/or nano fibers. More preferably, the present nonwoven web is a meltblown web.

The fibers used in the nonwoven electret web of the present invention can have different shapes and can consist of one or more parts. Thus, the fibers can be homophil fibers or heterofil fibers. The latter can show different configurations, for example core-sheath-fibers, side-by-side-fibers or island-to-sea-fibers. Examples of fiber shapes are circular-, ellipsoidal-, delta-, rectangular-, triangular-, square-, X-, Y-, W- or Z-shape, or bi- or polymodal shape.

In a preferred embodiment of the present invention, the nonwoven web has a gradient fiber density structure. Preferably, such a nonwoven web contains a layer comprising micro fibers and/or nano fibers. More preferably, the nonwoven web contains a melt-spun layer with a gradient fiber density structure. In a gradient fiber density structure, the fiber density of the nonwoven web varies along the direction perpendicular to the plane of the web. A gradient fiber density structure can be obtained by variation of the deposition of the fibers during the web formation process. The person skilled in the art will understand the process parameters to be varied in order to obtain said gradient fiber density nonwoven webs. Gradient structures follow the principle of depth filtration. A gradient fiber density can be formed by a general reduction in fiber size or density or the combination of both from air-inlet (upstream) to the outlet (downstream) side. The use of a gradient structure allows ideally the dirt (dust) to penetrate the entire depth of the filter-media. Contrary to this, a surface filter-media forms a filter cake on the surface of the media which results in a relatively quick increase in pressure drop. The described advantages in pressure drop and dirt (dust) holding lead to a longer life time of the filter-media when in use. Thus, use of a gradient fiber density has a considerable advantage in terms of life time of filter-media.

In another preferred embodiment of the present invention, the nonwoven web comprises fibers, preferably melt-spun fibers, with differing fiber diameters, such as fine fibers and coarse fibers, more preferably micro fibers. In this embodiment the coarse fiber have preferably an average fiber diameter of between 3-10 µm and the fine fibers have preferably an average fiber diameter of between 1-3 µm. In case of fibers with a non-circular cross section, the average values indicated above refer to the axis with the largest diameter of the fiber cross-section. It has been found that when combinations of coarse fibers and of fine fibers are used that comprise the first and second additives (a) and (b) the formation of nonwoven webs with gradient fiber density structures is improved.

If fibers with differing diameters are used in accordance with the present invention, the proportion of fibers with the larger diameter is suitably between 50-80% and the proportion of fibers with smaller diameters is suitably between 20-50%, based on total number of fibers.

The nonwoven electret webs of the present invention can be formed from any solvent- and/or melt-spinable material, preferably they are formed from thermoplastic polymer materials. The nature of the polymer material is not critical as long as it allows the treatment at the selected spinning temperature without degradation; it has a molecular weight high enough to enable a melt-spinning process or a solvent-spinning process; and it has a viscosity at the spinning temperature that allows the spinning of the polymer.

Examples of preferred polymers are thermoplastic polymers, preferably thermoplastic polyesters, thermoplastic polyamides, thermoplastic polyurethanes, thermoplastic polyolefins. Preferred polyolefins include polyethylene and/or polypropylene.

In a particularly attractive embodiment of the present invention, the nonwoven web according to the present invention comprises fibers, wherein the polymer forming the fibers is a polyolefin or a combination of different polyolefins. Preferably, the polymer forming the fibers is a polypropylene or a combination of different polypropylenes.

The area weights of the nonwoven electret webs of the present invention are suitably between 1-300 g/m$^2$.

The nonwoven electret webs of the present invention can be processed as conventional single layer webs or can be combined with other layered materials to form a multilayered sheet. Preferably, melt-blown webs are combined with one or more conventional nonwoven layers, for example spunbond layers. The melt-blown layers are suitably formed directly on the surface of a conventional nonwoven layer.

The present invention also provides a multilayered sheet wherein at least one layer is formed from a nonwoven electret web of the present invention.

In a preferred embodiment of the present invention, the multilayered sheets comprise a stiffening nonwoven, netting or mesh layer to make it pleatable which layer contains on at least one of its surfaces a layer of a web comprising micro fibers and/or nano fibers. Preferably, such a layer contains meltblown fibers made from thermoplastic polymers containing a first additive (a) which comprises a hindered amine and a second additive (b) which comprises a metal salt of a carboxylic acid and/or an organic amide derived from a carboxylic acid and an amine.

In another preferred embodiment of the present invention, the multilayered sheets comprise a combination of a nonwoven electret web layer and a coarse filter layer which is selected from the group consisting of wet-laid high capacity paper, dry-laid high capacity paper, high-bulk meltblown nonwoven, modular spunbond nonwoven and a microdenier spunbond nonwoven layer, which coarse filter layer is positioned upstream in the direction of air flow of the nonwoven electret web layer.

Such coarse filter layers are for instance described in EP 0 960 645 A2. The coarse filter layer is a layer made of coarse fibers and has typically a low density.

The invention also relates to a process for manufacturing the nonwoven electret web of the present invention. Hence, the present invention also relates to a process for manufacturing a nonwoven electret web, which process comprises the steps of:
  i) providing a thermoplastic polymer material which comprises a polymer, a first additive (a) and a second additive (b), wherein the first additive (a) comprises a hindered amine, and the second additive (b) comprises a metal salt of a carboxylic acid and/or an organic amide derived from a carboxylic acid and an amine;
  ii) forming fibers from the thermoplastic polymer material;
  iii) forming from the fibers as formed in step (ii) a nonwoven web; and;
  iv) treating the fibers as formed in step (ii) and/or the nonwoven web as formed in step (iii) with a polar liquid to obtain a nonwoven with an electret charge.

The thermoplastic polymer material, the first additive (a) and the second additive (b) that can suitably be used in the process have been defined hereinbefore.

In step (iii), use can be made of any known web-formation process.

In step (iii), preferably a dry-laid process is used. Preferably, in step (ii) a spunbond process or a melt-blown process is used. More preferably, in step (ii) a melt-blown process is used.

In step (iv), the fibers as formed in step (ii) and/or the nonwoven web as formed in step (iii) is treated with an effective amount of the polar liquid so as to obtain a nonwoven web with an electret charge. Suitably, such a treatment is carried out by means of a spray treatment. The polar liquid can be a liquid alcohol or water. Preferably, water is used as the polar liquid. Preferably, distilled or deionized water is used. Also mixtures of polar liquids can be used. The polar liquid is preferably sprayed onto the fibers as formed in step (ii) and/or the nonwoven as formed in step (iii) by means of a nozzle or any other droplet-forming device, which is capable of forming droplets that comprise fractions with different droplet diameters.

Suitably, the polar liquid is sprayed onto the fibers immediately after these have been formed, for instance immediately after the fibers have left the spinning nozzle. It is known to use polar liquids such as water as a quenching liquid to cool fibers immediately after their formation. In case water is used as the quenching liquid, such a cooling step is called a water quench.

In this connection, it is observed that U.S. Pat. No. 3,959,421 discloses a conventional meltblowing die and collector apparatus with water spray nozzles positioned there between. The nozzles are air-driven nozzles which use compressed air to break up, or atomize, liquid water to produce a spray of water droplets. The droplets are directed onto opposite sides of the extruded fibers at a position upstream of that where shot would form in an otherwise unquenched process. The water droplets cool the fibers primarily through evaporative cooling wherein the liquid water droplets are vaporized, thereby removing the latent heat of vaporization from the fibers. The disclosed application of quenching fluid allows a production rate of up to about 3.0 lb/hr/in. The production rate is limited by the maximum allowable quench water rate without the formation of a so-called wet web. In this context it is observed that a wet web is a web which has liquid water entrapped within voids in the fabric.

Further, U.S. Pat. No. 4,594,202 discloses the use of air-driven water atomizer nozzles for use in producing tubular meltblowns having fiber diameters in excess of 2.5 microns.

From these two US patent specifications, it is apparent that improvements in the application of an evaporative quenching are important for improving the economics of the meltblowing process as a whole, both from the standpoint of eliminating shot at high production rates, as well as improving web properties over a range of production rates.

In the process of the present invention, spraying nozzles for the polar liquid can be arranged as disclosed in U.S. Pat. No. 3,959,421 and U.S. Pat. No. 4,594,202. The spraying nozzles can for instance be used in a melt-blown device but also in other web formation devices, such as in a conventional spunbond device. In an alternative embodiment of the present invention, spraying nozzles can be arranged in a later stage of fiber processing, for example in the portion of the apparatus where the formed fibers travel between the spinning nozzle and the conveyor or take up screen for web formation or in the portion of the apparatus where the fibers have been collected on a conveyor or take up screen and have formed a nonwoven web.

In step (iv), the fibers as formed in step (ii) and/or the nonwoven web as formed in step (iii) are treated with the polar liquid to obtain a nonwoven with an electret charge. The fibers as formed in step (ii) can be treated with the polar liquid, the nonwoven web as formed in step (iii) can be treated with the polar liquid, or both the fibers as formed in step (ii) and the nonwoven web as formed in step (iii) can be treated with the polar liquid. In the latter case part of the total amount of polar liquid used is applied to treat the fibers as formed in step (ii) whereas the remaining part of the polar liquid is used to treat the nonwoven web as formed in step (iii). An effective amount of polar liquid is used so as to provide a nonwoven web with an electret charge. However, it is important to use not too much polar liquid because otherwise a wet web will be obtained, requiring a subsequent drying step (v). Preferably, the present process is carried out with such an amount of polar liquid that no separate drying step is required. Preferably, the fibers as formed in step (ii) are treated with the polar liquid before the fibers are subjected to web formation in step (iii). More preferably, only the fibers as formed in step (ii) are treated with the polar liquid before the fibers are subjected to web formation in step (iii).

Hence, preferably the present process for manufacturing a nonwoven electrets web comprises the steps of:
  i) providing a thermoplastic polymer material which comprises, a polymer, a first additive (a) and a second additive (b), wherein the first additive (a) comprises a hindered amine, and the second additive (b) comprises a metal salt of a carboxylic acid and/or an organic amide derived from a carboxylic acid and an amine;
  ii) forming fibers from the thermoplastic polymer material;
  iii) treating the fibers as formed in step (ii) with a polar liquid;
  iv) forming from the fibers as formed in step (iii) a nonwoven web with an electrets charge.

In the process of this invention the amount of polar liquid applied is sufficient to develop electret properties. Preferably, the polar liquid is evaporated during the web-formation in step (iii) without the need for a subsequent drying step, although such a drying step may optionally be present.

Preferably, the polar liquid is applied to the fibers immediately after these have been formed. for instance immediately after the fibers have left the spinning nozzle.

In a preferred embodiment of the process of this invention, the polar liquid is applied, preferably sprayed, onto the fibers at a pressure between 10-150 bar, more preferably between between 30-120 bar.

The nonwoven electret webs produced with the process of the present invention can suitably be stabilized after a non-consolidated web has been formed. Known stabilisation treatments can be used which generally include a (hydro) mechanical treatment and/or the use of an adhesive. The adhesive can be applied to the non-stabilized web and/or can be formed by the use of binder fibers in the non-stabilized web and with the action of hot rolls. Such adhesives are as such well-known in the art.

The combination of the first additive (a) and the second additive (b) in the thermoplastic polymer material to be used in the present invention allows to obtain nonwoven electret webs with both a high electric charge density and a high stability of these charges, even under harsh ambient conditions, such as high temperatures and high humidities. In accordance with the present invention nonwoven electret webs can be obtained that display a considerably improved performance. The present nonwoven electret webs pass the ageing test of EN 149:2009 comfortably, as well as the challenging treatment as described in the new draft of EN779, wherein the filter media are treated with isopropanol. As a result of the use of the combination of the first additive (a) and the second additive (b), the pressure drop in the spraying nozzles and/or the total area weight of the nonwoven electret web can be drastically reduced when compared to standard corona-charged nonwoven electret webs.

The nonwoven electret webs according to the present invention can be used in all fields of technology wherein use of electret webs is advisable. Preferably, these webs are used as filter materials or dust-removing fabrics for cleaning purposes. Therefore, the present invention also relates to the use of the nonwoven electrets web of the present invention or a multilayered sheet according to the present invention as a filter material or a dust-removing fabric for cleaning purposes.

The nonwoven electret webs of this invention can be used, for example, in the manufacturing of FFP1-FFP3 respirator media. The webs can be used in all fields of air filtration, for example in HVAC ("heating, ventilating and air conditioning"), in process air filtration, in cabin air cleaners, in clean room applications, in vaccuum cleaners and in industrial de-dusting.

The present invention also relates to a fiber made from a thermoplastic polymer material which comprises a first additive (a) and a second additive (b), wherein the first additive (a) comprises a hindered amine and the second additive (b) comprises a metal salt of a carboxylic acid and/or an organic amide derived from a carboxylic acid and an amine.

The present invention also provides a process for manufacturing the fibers according to the present invention. Accordingly, the present invention also relates to a process for manufacturing a fiber which comprises the steps of:
  i) providing a thermoplastic polymer material which comprises a polymer, a first additive (a) and a second additive (b), wherein the first additive (a) comprises a hindered amine, and the second additive (b) comprises a metal salt of a carboxylic acid and/or an organic amide derived from a carboxylic acid and an amine;
  ii) forming fibers from the thermoplastic polymer material; and
  iii) treating the fibers as formed in step (ii) with a polar liquid.

The thermoplastic polymer material, the first additive (a) and the second additive (b) that can suitably be used in the process have been defined hereinbefore.

The present invention also relates to an article which comprises a nonwoven electrets web or fibers according to the invention. Examples of such an article include filters and dust-removing fabrics.

The following examples illustrate the invention without limiting it.

Example 1 (Comparative Example)

Various webs were tested. A number of webs were made of fibers that contain different thermoplastic polymer materials. A first web was produced with a standard meltblown process and a subsequent corona treatment. The first web was formed from a 800 g/10' MFR polypropylene resin (200° C., 2.16 kg according to ISO 1133). Prior to spinning, the polypropylene resin was mixed with 1.6% by weight of Crodamide® EBS, an commercially available ethylene bis-stearamide. The fibers so obtained were subjected to a web formation process to form a web of two layers of a melt-blown material. The web so obtained was exposed to a corona discharge unit to place charges on the fiber surface.

The process conditions were chosen to achieve an efficiency of more than 94% after aging.

Example 2 (Comparative Example)

A second web was prepared as described in Example 1, except that the thermoplastic polymer material contained 1.6% by weight of Chimasorb® 944 instead of 1.6% by weight of Crodamide® EBS; no corona treatment was used; and the fibers obtained were sprayed with water at a pressure of 50 bar before the sprayed fibers were subjected to a web formation process. The water forming a fraction of large and small droplets was sprayed with a 90° angle into a stream of fibers coming out of a meltblown spinneret. Unlike known water-quenching steps, the focus here was to produce the required amount of electrets charges on to the fibers. The second web so obtained contained an electric charge.

Example 3 (According to the Invention)

A third web was prepared as described in Example 2, except that the thermoplastic polymer material also included 1.6% by weight of Crodamide® EBS.

In Examples 2 and 3 the webs were produced in such a way that similar fiber diameters were achieved.

The three webs were subjected to pressure drop and penetration evaluation test which were carried out using a Lorenz FMP 03 tester with a paraffin oil aerosol concentration of 20+/−5 mg/m$^3$.

To evaluate the aged webs, each of the three webs was tested after conditioning as described in EN 149:2009. The penetration of paraffin oil aerosol was evaluated after the web concerned was conditioned for 24 hours at 70° C. After a 4 hour rest, the webs were conditioned for 24 hours at −30° C. The penetration values were taken after a 4 hour rest and a 120 mg paraffin oil aerosol loading. This conditioning and loading with paraffin oil will be hereafter called ageing. Each reported result was an average of six single values.

The area weight of the webs were determined using DIN EN 29073-1/ISO 9073-1, whereby the area weights were rounded to the next decimal digit. All area weights determined are expressed as the total sum of the two layers and an average of six single values, and the area weights were determined before ageing.

In FIG. 1, the performance of the webs after ageing of FFP2 media (in accordance to EN149:2009) is shown.

From FIG. 1 it will be clear that the third web according to the present invention displays superior properties in terms of paraffin oil aerosol efficiency and pressure drop when compared with the first and second webs which are not in accordance with the present invention. In this respect it is noted that the third web displays considerably improved paraffin oil aerosol efficiency (99.35% versus respectively 95.5% and 90.8%), whereas at the same time its pressure drop is very similar to that of the second web.

The invention claimed is:

1. A nonwoven electret web comprising fibers made from a thermoplastic polymer material comprising a polymer, a first additive (a) and a second additive (b), wherein the first additive (a) traps charges generated in the fiber during treatment with a polar liquid, and
wherein the first additive (a) comprises a hindered amine and the second additive (b) is an anti-discharge agent for the charges when the fibers are aged or heat treated, the second additive (b) comprising an organic amide derived from a carboxylic acid having 29-50 carbon atoms.

2. The nonwoven electret web according to claim 1, wherein the second additive comprises an organic amide derived from a carboxylic acid having 29-50 carbon atoms and an aliphatic amine with one or two primary and/or secondary amino groups, wherein the aliphatic amine of the second additive has 1-6 carbon atoms in the aliphatic group.

3. The nonwoven electret web according to claim 2, wherein the aliphatic amine of the second additive comprises a diamine.

4. The nonwoven electret web of claim 1, wherein the nonwoven electret web comprises a trimodal fiber distribution comprising (i) coarse fibers having an average fiber diameter from greater than 3 to 10 μm, (ii) fine fibers having an average fiber diameter from 1 to 3 μm, and (iii) sub-micron fibers having an average fiber diameter from 50 to 100 nm; and wherein the fine fibers, the sub-micron fibers, or both comprise meltblown fibers, wherein the proportion of coarse fibers is between 50-80% and the proportion of fine fibers is between 20-50%, based on total number of fibers.

5. The nonwoven electret web according to claim 1, wherein each of the first additive (a) and the second additive (b) is present in an amount of 0.5-3% by weight, based on total fiber weight.

6. The nonwoven electret web according to claim 1, wherein the second additive (b) comprises an organic bis-amide, derived from aliphatic diamines and two carboxylic acids.

7. The nonwoven electret web according to claim 1, wherein the second additive (b) comprises an organic bis-amide derived from aliphatic diamines and a dicarboxylic acid.

8. The nonwoven electret web according to claim 1, wherein the nonwoven has a gradient fiber density structure.

9. The nonwoven electret web according to claim 1, wherein the polymer comprises a polypropylene or a combination of different polypropylenes.

10. A multilayered sheet comprising at least one layer of a nonwoven electret web as described in claim 1.

11. A process for manufacturing a nonwoven electret web as described in claim 1, which process comprises the steps of:
i) providing a thermoplastic polymer material comprising a polymer, a first additive (a) and a second additive (b), wherein the first additive (a) traps charges generated in the fiber during treatment with a polar liquid, and the second additive (b) is an anti-discharge agent for the charges when the fibers are aged or heat, the second additive (b) comprising an organic amide derived from a carboxylic acid having 29-50 carbon atoms and an aliphatic amine with one or two primary and/or secondary amino groups and the first additive (a) comprises a hindered amine;
ii) forming fibers from the thermoplastic polymer material;
iii) forming from the fibers as formed in step (ii) a nonwoven web; and
iv) treating the fibers as formed in step (ii) and/or the nonwoven web as formed in step (iii) with a polar liquid to obtain a nonwoven with an electret charge.

12. The process according to claim 11, wherein the fibers as formed in step (ii) are treated with the polar liquid before the fibers are subjected to web formation in step (iii).

13. The process according to claim 11, wherein the polar liquid is water in the form of droplets comprising fractions with different droplet diameter.

14. The process according to claim 11, wherein the polar liquid is sprayed to the fibers immediately after the fibers have left a spinning nozzle.

15. The process according to claim 11, wherein the polar liquid is sprayed at the fibers as formed in step (ii) and/or the nonwoven web as formed in step (iii) at a pressure between 30-120 bar.

16. The process according to claim 11, wherein the nonwoven electret web comprises a trimodal fiber distribution comprising (i) coarse fibers having an average fiber diameter from greater than 3 to 10 μm, (ii) fine fibers having an average fiber diameter from 1 to 3 μm, and (iii) sub-micron fibers having an average fiber diameter from 50 to 100 nm, and wherein the fine fibers, the sub-micron fibers, or both comprise meltblown fibers, wherein the proportion of coarse fibers is between 50-80% and the proportion of fine fibers is between 20-50%, based on total number of fibers.

17. A method for filtering a fluid or removing dust from a surface comprising contacting the fluid or surface with a multilayered sheet according to claim 10.

18. An article comprising a multilayered sheet according to claim 10.

19. A method for filtering a fluid or removing dust from a surface comprising contacting the fluid or surface with a nonwoven electret web according to claim 1.

20. An article comprising a nonwoven electret web as described in claim 1.

* * * * *